US010098500B1

(12) United States Patent
Hutton

(10) Patent No.: US 10,098,500 B1
(45) Date of Patent: Oct. 16, 2018

(54) BARBEQUE SMOKER SYSTEM AND METHOD OF USE

(71) Applicant: J. D. Hutton, Rising Star, TX (US)

(72) Inventor: J. D. Hutton, Rising Star, TX (US)

( * ) Notice: Subject to any disclaimer, the term of this patent is extended or adjusted under 35 U.S.C. 154(b) by 240 days.

(21) Appl. No.: 15/187,975

(22) Filed: Jun. 21, 2016

Related U.S. Application Data

(60) Provisional application No. 62/187,626, filed on Jul. 1, 2015.

(51) Int. Cl.
*A23B 4/052* (2006.01)
*A47J 37/07* (2006.01)
*A23B 4/044* (2006.01)

(52) U.S. Cl.
CPC .............. *A47J 37/07* (2013.01); *A23B 4/052* (2013.01); *A23B 4/044* (2013.01)

(58) Field of Classification Search
CPC .................................. A23B 4/052; A23B 4/044
USPC ....... 99/482, 467, 474, 473; 126/19 R, 21 R, 126/273 R, 312, 307 R
See application file for complete search history.

(56) References Cited

U.S. PATENT DOCUMENTS

| 3,789,824 | A | * | 2/1974 | Mason | A47J 37/00 |
| | | | | | 126/59.5 |
| 3,882,767 | A | * | 5/1975 | Oyler | A21B 1/24 |
| | | | | | 126/21 R |
| 4,418,615 | A | * | 12/1983 | Higgins | F24C 1/04 |
| | | | | | 126/21 A |
| 4,700,618 | A | * | 10/1987 | Cox, Jr. | A21B 1/28 |
| | | | | | 126/25 R |
| 4,934,260 | A | * | 6/1990 | Blevins | A23B 4/052 |
| | | | | | 126/21 A |
| 7,984,672 | B1 | * | 7/2011 | Yun | A23B 4/052 |
| | | | | | 99/468 |
| 2014/0030401 | A1 | * | 1/2014 | Cusack | A47J 37/0763 |
| | | | | | 426/314 |

FOREIGN PATENT DOCUMENTS

DE    2208021    * 8/1973    ............. A23B 4/052

* cited by examiner

*Primary Examiner* — Reginald L Alexander
(74) *Attorney, Agent, or Firm* — Eldredge Law Firm, LLC; Richard Eldredge; Beth Felix

(57) ABSTRACT

A cooking system includes an upper cooking chamber configured to receive food therein; a lower heating chamber configured to burn fuel therein; a conduit in fluid communication between the upper cooking chamber and the lower heating chamber; a first valve operably associated with the conduit, the first valve being configured to open and close access between the upper cooking chamber and the lower heating chamber; a flue in gaseous communication with both the lower heating chamber and the upper cooking chamber; a second valve operably associated with the flue and the lower heating chamber, the second valve being configured to open and close access between the lower cooking chamber and the flue; and a third valve operably associated with the flue and the lower heating chamber, the second valve being configured to open and close access between the lower cooking chamber and the flue.

4 Claims, 7 Drawing Sheets

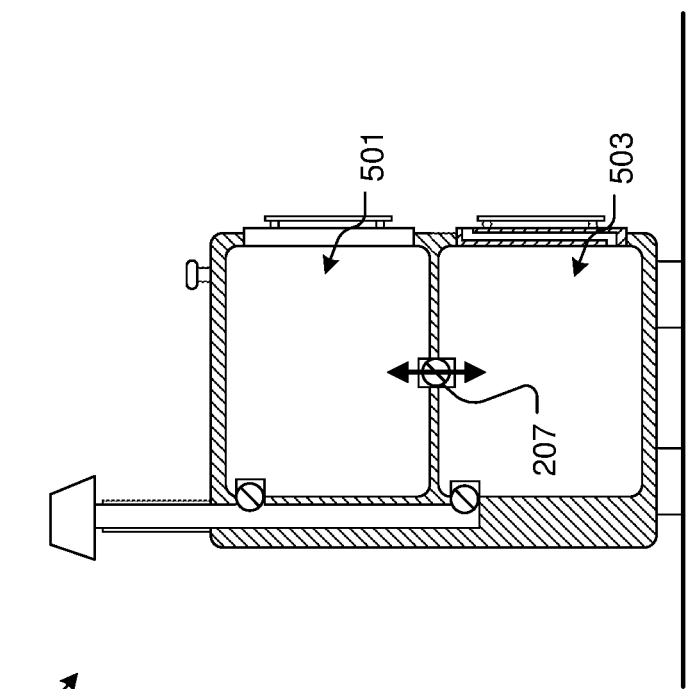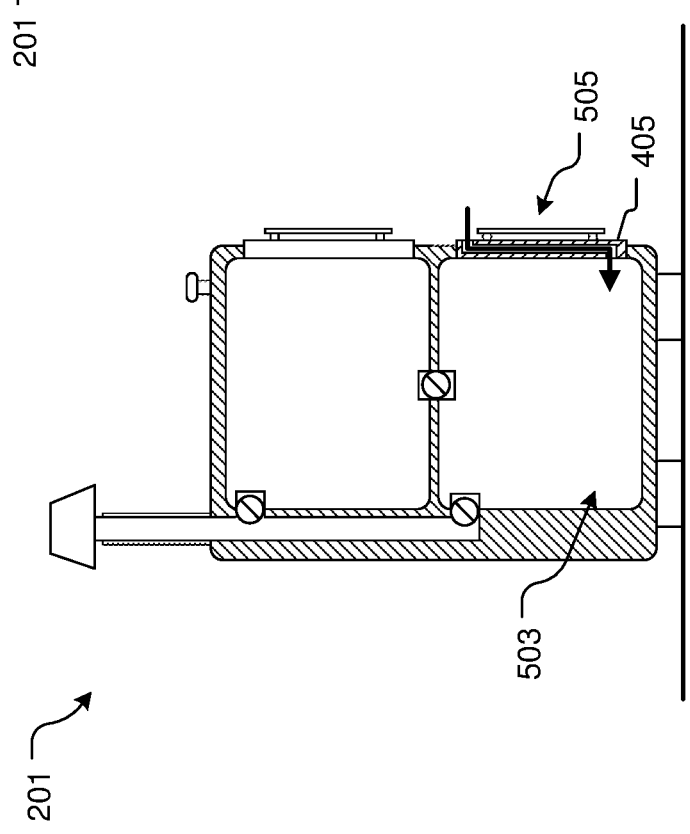

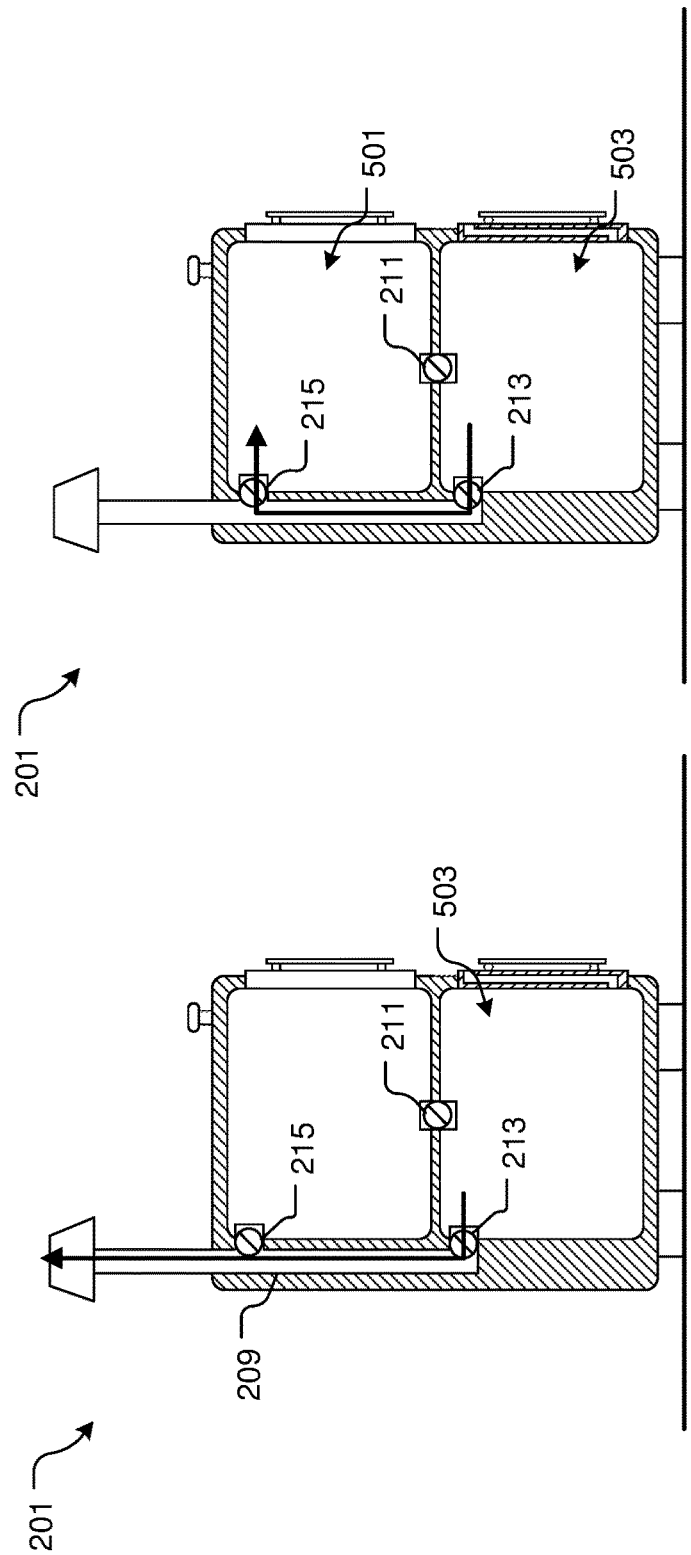

BARBEQUE SMOKER SYSTEM AND METHOD OF USE

BACKGROUND

1. Field of the Invention

The present invention relates generally to barbeque grills and/or pits, and more specifically, to a barbeque smoker.

2. Description of Related Art

Barbecue pits and/or grills are well known in the art are effective outdoor means to cook food. For example, FIG. 1 depicts a conventional barbeque grill 101 having a body 103 that forms a cavity to carry burning materials therein to cook food placed on a grill 109. The body 103 is elevated at a height relative to the ground surface 107 via a plurality of legs 105.

One commonly disadvantage with grill 101 is the limited use and inefficiency in cooking food. For example, the open grill concept does not trap and reuse the heat from the burning material within the cavity. A lid can be placed over the grill 109, however, this process has limitations, too. Further, the grill 101 does not maximize the use of the smoke from the burning material to enhance flavor and for cooking.

Although great strides have been made in the area of barbecue grills, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 7-10 are simplified methods of use of the system of FIG. 2.

Figure 1:
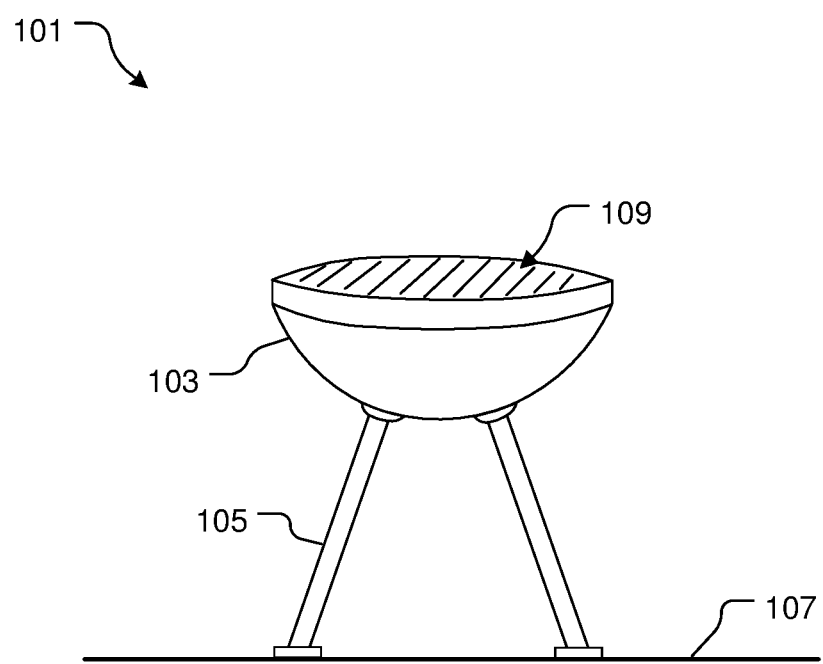
FIG. 1 is a front view of a conventional barbecue grill.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional barbecue grills. Specifically, the barbecue grill system and method of the present application provides rapid and effective means to reuse smoke from burning material for enhancing flavor in addition to cooking. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
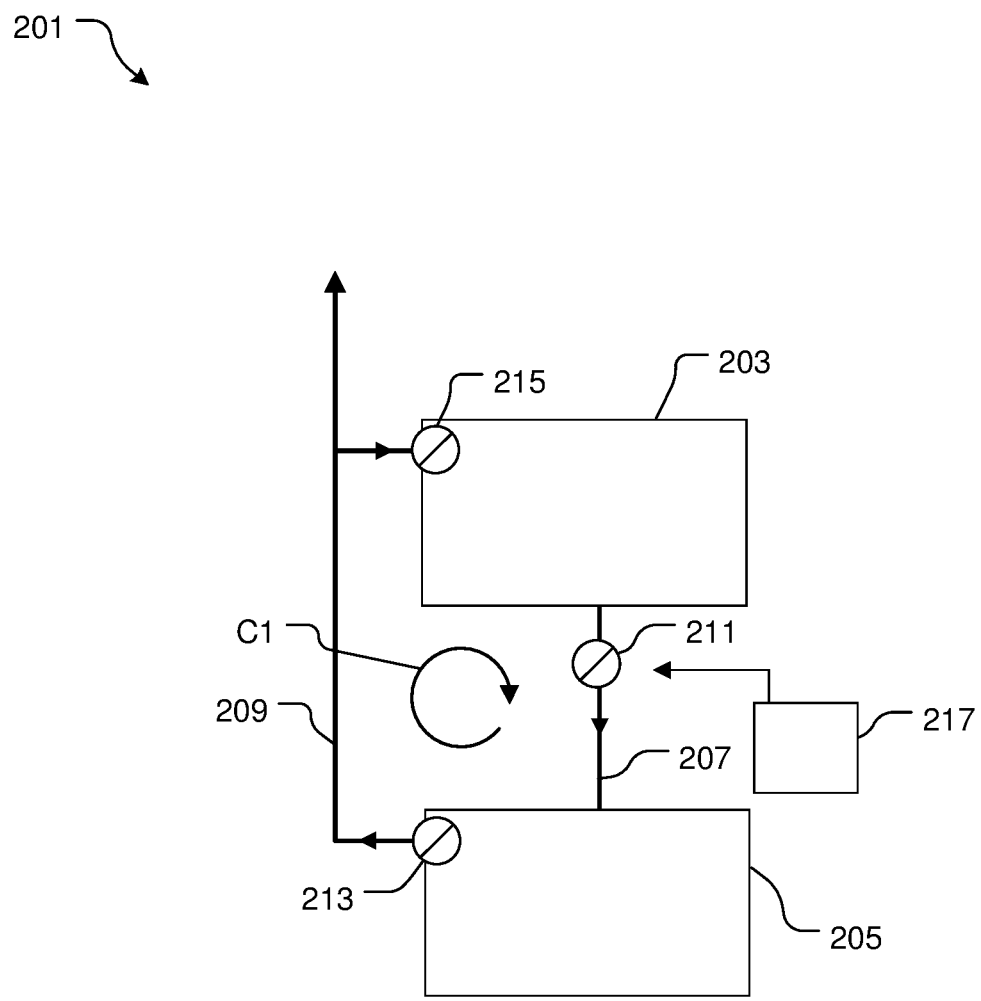
FIG. 2 is a simplified schematic of the barbeque grill system in accordance with a preferred embodiment of the present application.
Figure 3:
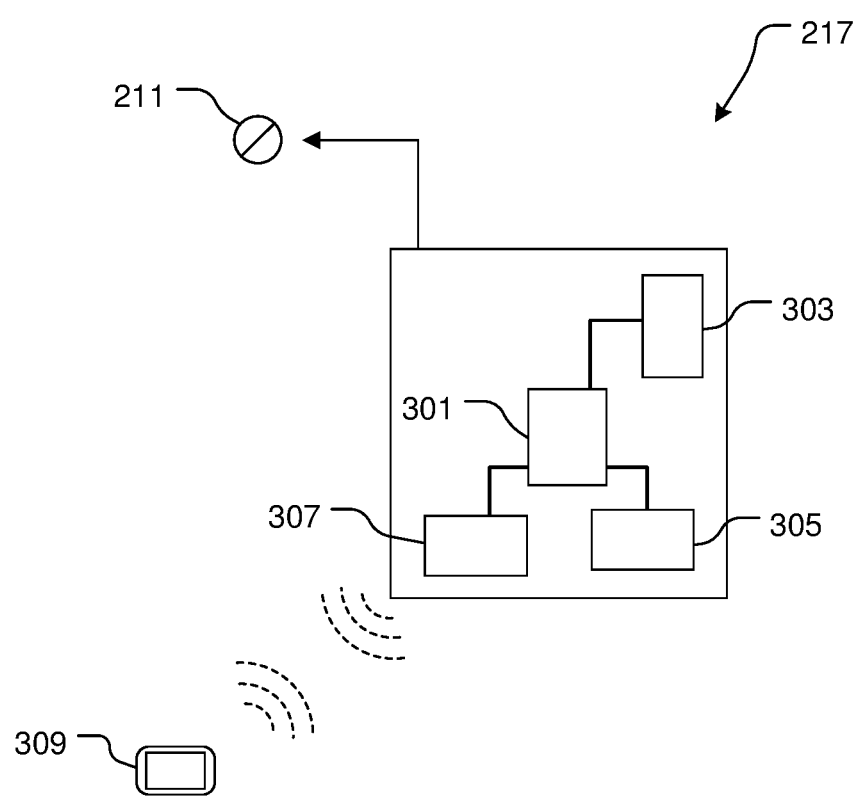
FIG. 3 is a simplified schematic of the control system of the system of FIG. 2.

Referring now to the drawings wherein like reference characters identify corresponding or similar elements throughout the several views, FIGS. 2 and 3 depict simplified schematics of a barbecue grill system 201 and method of use in accordance with a preferred embodiment of the present application. It will be appreciated that system 201 overcomes one of more of the above-listed problems commonly associated with the conventional barbecue grills.

In the contemplated embodiment, system 201 includes one or more of a cooking chamber 203 and a heating chamber 205 in gaseous communication with each other via conduit 207 and/or conduit 209. During use, the heat from chamber 205 is used to cook the food disposed within chamber 203.

One of the unique features believed characteristic of the present application is the process of regulating the heat and/or smoke transferred from chamber 205 to chamber 203. To achieve this feature, system 201 is provided with a plurality of valves 211, 213, and 215 configured to allow passage of heat and smoke between the two chambers via the plurality of conduits.

Figure 4:
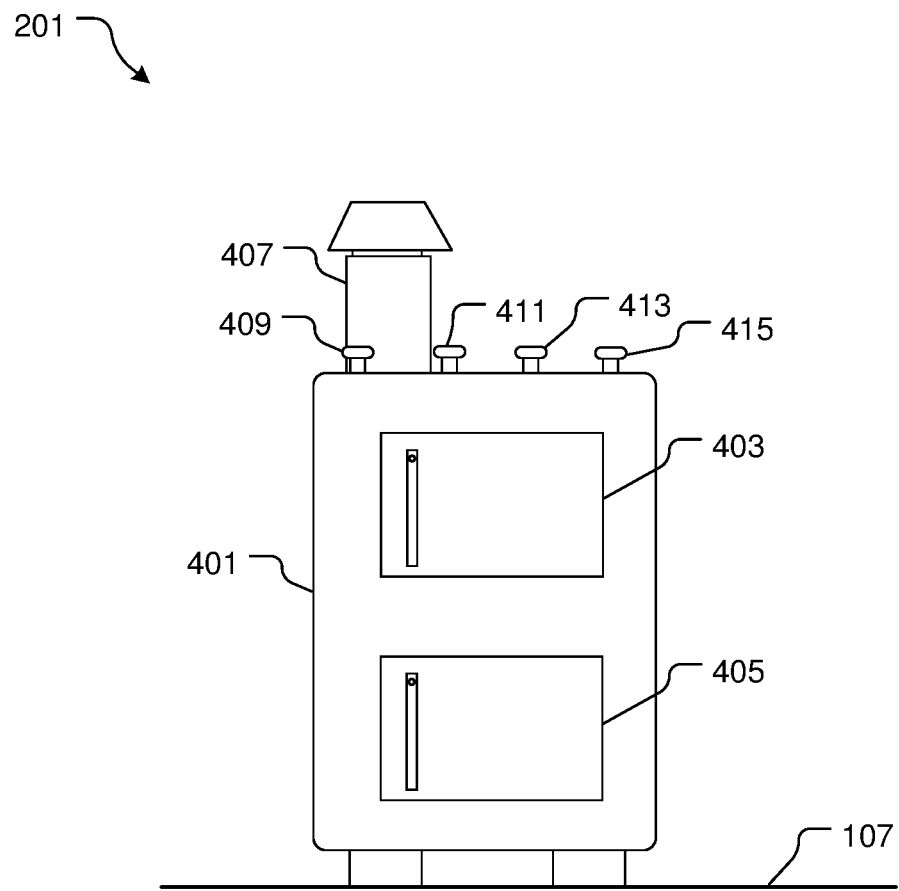
FIG. 4 is a front view of the system of FIG. 2.

In the preferred embodiment, the valves are manipulated manually via one or more knobs, see, e.g., FIG. 4. However, it will be appreciated that it is also contemplated using a control system 217 operably associated with the valves and configured to autonomously shut and open the valves to achieve optimal flavor enhancement and cooking.

As depicted with circular arrow C1, the heat and/or smoke from chamber 205 is circulated to chamber 203 via the plurality of conduits and valves during use.

It will be appreciated that system 201 thus provides an effective means to control the humidity, heat, flavor enhancement, while also maximizing heat exchange between the chambers.

Referring now to FIG. 3, the components of control system 217 are shown. Although depicted as being operably associated with valve 211, it will be appreciated that system 217 could be operably associated with one or all of the valves discussed herein. In addition, it is contemplated using servos, e.g., electric motors, to open and close the valves during use.

System 217 preferably includes one or more of a computer 301 having the necessary hardware and software to regulate system 201, a thermometer 303, an indicator 305 to provide visual and/or audible notice, and a transceiver 307. In one embodiment, the transceiver 307 could communicate with a mobile device 309 configured to command and control system 217.

In FIG. 4, a front view of system 201 is shown having an insulated body 401 with two doors 403, 405 pivotally attached to body 401 and configured to provide access to respective chambers 203, 205. A flue 407 is in gaseous communication with chambers 203, 205 and is preferably positioned at the rear of body 401. A plurality of control handles 409, 411, 413, and 415 are secured to a top surface of body 401 and are configured to manually open and close one or more valves operably associated with the conduits discussed herein.

Accordingly, during use the user will manually manipulate the handles to regulate the humidity, heat transfer, smoke transfer to achieve optimal flavor and cooking conditions. It will be appreciate that system 217 could be use in lieu of or with the control handles in the preferred embodiment.

Figure 5:
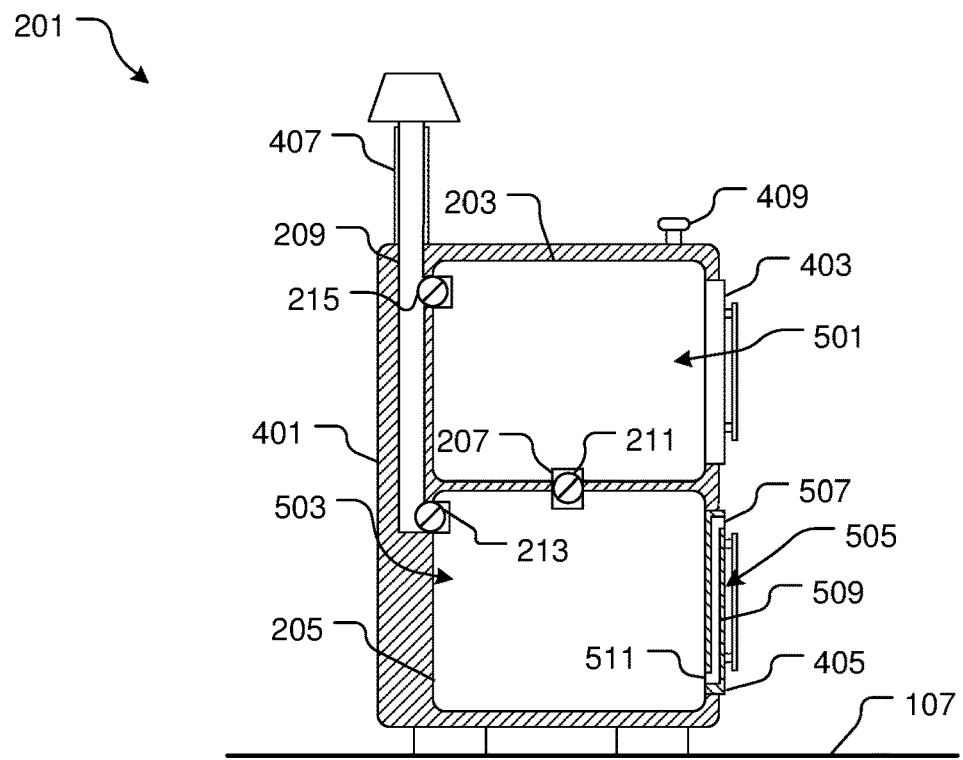
FIG. 5 is a partial cross-sectional side view of the system of FIG. 2.

Referring now to FIG. 5 in the drawings, a partial cutout side view of system 201 is shown. In the preferred embodiment, chamber 203 forms an inner area 501 configured to receive the food therein, while chamber 205 forms an inner area 503 configured to receive the burning materials therein.

Another unique feature believed characteristic of the present system 201 is a vent system 505 disposed within door 405 and configured to provide outside air to inner are 503, which in turn increases the burn efficiency. To achieve this feature, system 505 is provided with a first port 507, an elongated channel 509, and a second port 511, the components being configured to channel air from outside the chamber 205 to the burning materials disposed within the inner area 503. It will be appreciated that one or more valves could be used to regulate the amount of air flow within vent 505.

Figure 6:
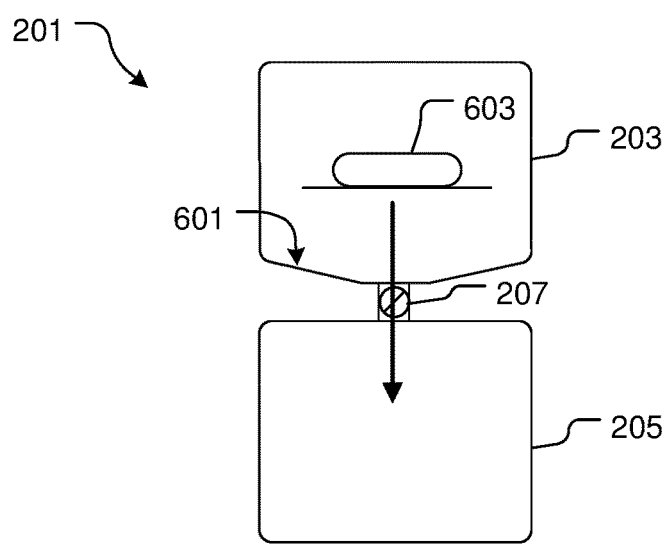
FIG. 6 is a side view of the inner chambers of the system of FIG. 5.

It will be appreciated that it is also contemplated having a sloped bottom surface 601 on the inner surface of chamber 203. These features are shown in FIG. 6, wherein food 603 disposed within chamber 203 drips fluid onto surface 601 and through conduit 207 to chamber 205. This feature allows the fluid to drip onto the burning material, which in turn further enhances the smoky flavor.

Referring next to FIGS. 7-10, various depictions of system 201 during use are shown. For example, FIG. 7 depicts the vent system 505 during use, wherein outside air enters into area 503. FIG. 8 depicts the process of heat and/or smoke transfer between the inner areas 501, 503 via conduit 207. In FIG. 9, valve 213 is in the open position while the valves 211 and 215 are closed, which in turn causes the heat and smoke to travel through the flue. In FIG. 10, the valves 213, 215 are in the open position, which in turn allows the heat and smoke to enter into area 501 from area 503. Accordingly, the valves can be manipulated to achieve the desired smoke, fluid dripping, and heat transfer between the chambers during use.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A cooking system, comprising:
   an upper cooking chamber configured to receive food therein;
   a lower heating chamber configured to burn fuel therein;
   a conduit in fluid communication between the upper cooking chamber and the lower heating chamber;
   a first valve operably associated with the conduit, the first valve is configured to open and close access between the upper cooking chamber and the lower heating chamber;
   a flue in gaseous communication with both the lower heating chamber and the upper cooking chamber;
   a second valve operably associated with the flue and the lower heating chamber, the second valve is configured to open and close access between the lower heating chamber and the flue; and
   a third valve operably associated with the flue and the upper cooking chamber, the third valve is configured to open and close access between the upper cooking chamber and the flue;
   wherein the upper cooking chamber has a contoured bottom surface configured to direct fluid to the first conduit; and
   wherein the fluid drips on the fuel within the lower heating chamber to form a gas for flavoring food cooked in the upper cooking chamber.

2. The system of claim 1, further comprising:
   a control system operably associated with the first valve, the control system being configured to open and close the first valve.

3. The system of claim 2, the control system comprising:
   a computer;
   a thermometer;
   a display; and
   a transceiver in data communication with a mobile device.

4. The system of claim 1, further comprising:
   a door pivotally attached to the lower heating chamber; and
   a vent system disposed within the door and configured to provide air passage through the door to an area within the lower heating chamber.

* * * * *